(12) United States Patent
Cheswick

(10) Patent No.: US 8,595,838 B2
(45) Date of Patent: *Nov. 26, 2013

(54) CONTEXTUAL ALERT OF AN INVASION OF A COMPUTER SYSTEM

(75) Inventor: William Roberts Cheswick, Bernardeville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/558,432

(22) Filed: Jul. 26, 2012

(65) Prior Publication Data

US 2012/0291130 A1    Nov. 15, 2012

Related U.S. Application Data

(63) Continuation of application No. 12/239,861, filed on Sep. 29, 2008, now Pat. No. 8,255,997.

(51) Int. Cl.
*G06F 21/00* (2013.01)
*G06F 11/30* (2006.01)
*G08B 3/00* (2006.01)

(52) U.S. Cl.
USPC .......................................... 726/23; 340/384.1

(58) Field of Classification Search
None
See application file for complete search history.

(56) References Cited

U.S. PATENT DOCUMENTS

| | | | |
|---|---|---|---|
| 5,953,502 A | 9/1999 | Helbig, Sr. | |
| 6,614,884 B2 | 9/2003 | Jang | |
| 6,654,751 B1 * | 11/2003 | Schmugar et al. | 1/1 |
| 7,079,020 B2 | 7/2006 | Stilp | |
| 7,084,756 B2 | 8/2006 | Stilp | |
| 7,136,918 B2 | 11/2006 | Urano et al. | |
| 7,308,714 B2 * | 12/2007 | Bardsley et al. | 726/23 |
| 7,475,405 B2 | 1/2009 | Manganaris et al. | |
| 7,739,739 B2 | 6/2010 | Dettinger et al. | |
| 7,890,619 B2 | 2/2011 | Morota et al. | |
| 7,941,856 B2 | 5/2011 | Rubin et al. | |
| 8,255,997 B2 * | 8/2012 | Cheswick | 726/23 |
| 2003/0035514 A1 | 2/2003 | Jang | |
| 2003/0200455 A1 | 10/2003 | Wu | |
| 2004/0073810 A1 | 4/2004 | Dettinger et al. | |
| 2006/0062365 A1 * | 3/2006 | Yeh et al. | 379/142.1 |
| 2006/0288414 A1 | 12/2006 | Kuroda | |
| 2007/0067839 A1 | 3/2007 | Hamada et al. | |
| 2007/0143338 A1 * | 6/2007 | Wang et al. | 707/103 R |
| 2008/0172741 A1 | 7/2008 | Reumann et al. | |
| 2012/0222120 A1 * | 8/2012 | Rim et al. | 726/24 |

OTHER PUBLICATIONS

U.S. Office Action dated Dec. 12, 2011 in U.S. Appl. No. 12/239,861.
U.S. Notice of Allowance dated May 10, 2012 in U.S. Appl. No. 12/239,861.

* cited by examiner

*Primary Examiner* — Christopher Revak
(74) *Attorney, Agent, or Firm* — Hartman & Citrin LLC

(57) ABSTRACT

Methods, systems, and computer-readable media for providing contextual feedback to a user of a computer system upon detection of an invasion of the computer system are provided herein. An invasion of the computer system is detected and a contextually appropriate alert is selected from a set of alerts. The alert is played immediately upon detection of the invasion so that the user is alerted to the invasion within close temporal proximity to the user's action that resulted in the invasion of the computer system. In addition, details of the invasion are logged to a diagnostic log file for later use by support personnel in repairing the computer system.

20 Claims, 3 Drawing Sheets

CONTEXTUAL ALERT OF AN INVASION OF A COMPUTER SYSTEM

CROSS-REFERENCE TO RELATED APPLICATIONS

This patent application is a continuation of and claims priority to U.S. patent application Ser. No. 12/239,861, now U.S. Pat. No. 8,255,997, entitled "Contextual Alert of an Invasion of a Computer System," filed Sep. 29, 2008, which is herein incorporated by reference in its entirety.

BACKGROUND

This application relates generally to the field of malware or virus detection in personal computers. More specifically, the disclosure provided herein relates to providing feedback upon the detection of an invasion of a computer from a malware program.

Malware is a software program designed to invade or damage a computer system without the user's consent. Malware may include computer viruses, trojan horses, worms, rootkits, spyware, adware, and any other software that unexpectedly or without authorization invades a user's computer. Traditional malware protection software concentrates on the prevention of malware invasions by detecting the presence of a malware program and removing the threat or warning the user before invasion of the computer can take place.

When a traditional malware protection system warns a user of a potential infection, the warning may often be obscure or contain technical terms and jargon unfamiliar to a layperson user. In addition, if the traditional malware protection system detects and removes a threat before invasion, it also removes any user training effect in that the user does not learn the potential consequences of certain actions the user has performed. Further, because the tricks and mechanisms for delivering a malware program to a computer are constantly changing and evolving, the detection of malware programs is complex and may yield erroneous results.

SUMMARY

It should be appreciated that this Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments of the disclosure presented herein include methods, systems, and computer-readable media for providing contextual, audible feedback to a user of a computer system upon detection of an invasion of the computer system. According to one aspect, a method is provided that detects the invasion of the computer system and selects a contextually appropriate alert tone from a set of alert tones. The alert tone is played through a speaker of the computer immediately upon detection of the invasion so that the user is alerted to the invasion within close temporal proximity to the user's action that resulted in the invasion of the computer system. In addition, details of the invasion are logged to a diagnostic log file for later use by support personnel in repairing the computer system.

In another aspect, a system for alerting a user of an invasion of a computer system is provided. The system includes a number of alert tones, each of which is a digital recording approximating a natural sound or utterance related to the context of a particular type or severity of invasion of a computer system. The system also includes a detection module that detects the invasion of the computer system, selects the appropriate alert tone that matches the context of the invasion, and immediately plays the alert tone on a speaker of the computer system.

In yet a further aspect, a computer-readable storage medium is provided that contains executable instructions that cause the computer to alert a user of an unexpected or unauthorized change in a system configuration of the computer. Upon detection of the unexpected or unauthorized change, the computer selects an alert from a set of contextual alerts that inherently convey to the user the type and severity of the unexpected or unauthorized change in the system configuration. The alert is then immediately played to the user and details regarding the unexpected or unauthorized change are logged to a diagnostic log file.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
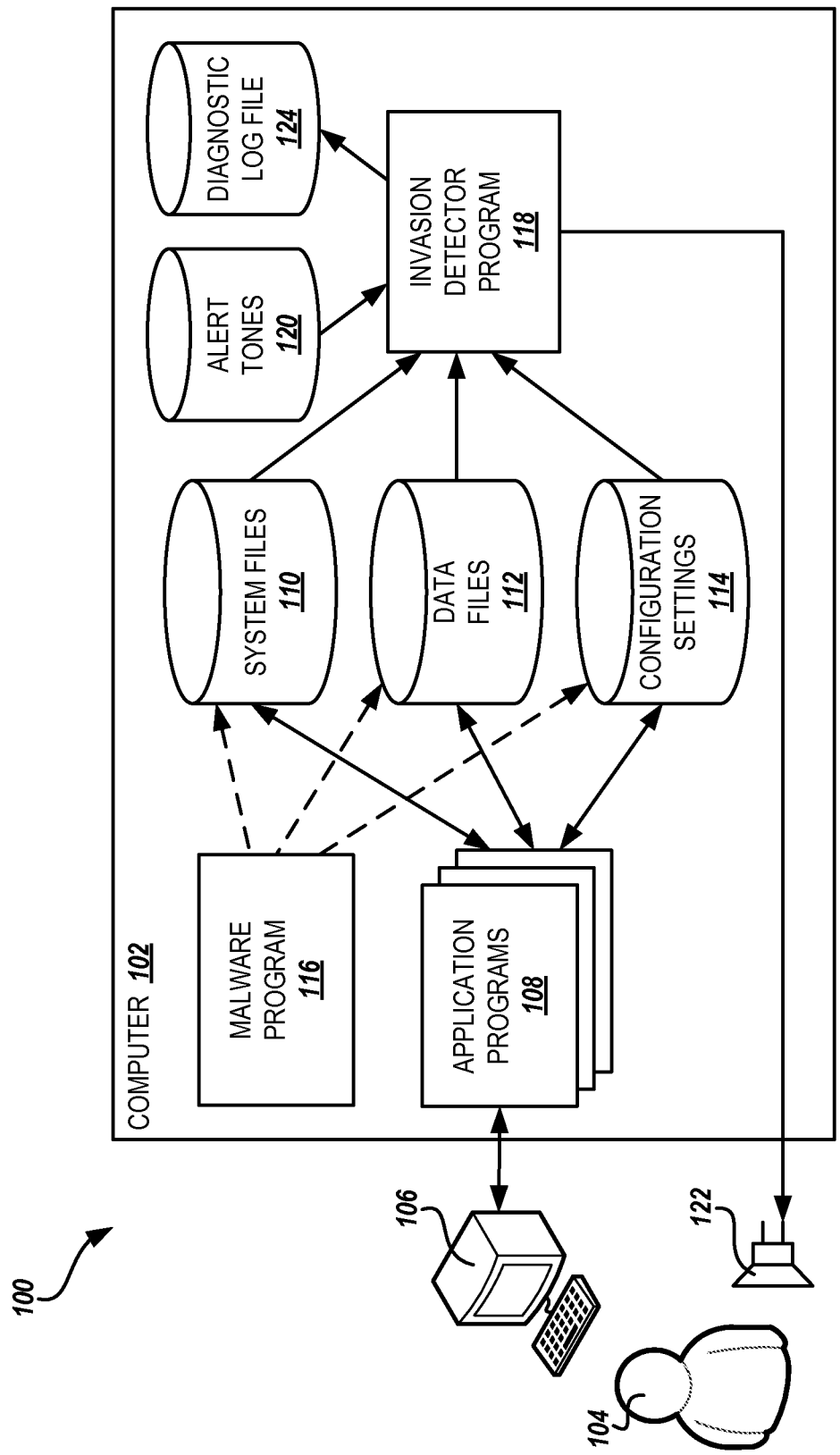
FIG. 1 is a block diagram illustrating an operating environment for providing contextual, audible feedback to a user upon detection of an invasion of a computer system, in accordance with exemplary embodiments.

The following detailed description is directed to methods, systems, and computer-readable media for providing contextual, audible feedback to a user of a computer system upon detection of an invasion of the computer system. Utilizing the technologies described herein, a contextually appropriate alert tone is played for the user immediately upon the detection of an invasion of the computer system. An alert tone is selected that inherently provides natural feedback to the user indicating the type and severity of the invasion without requiring the user to understand complex computer jargon or terminology. In addition, the immediate alert allows the user to be informed of the invasion in close temporal proximity to the user's actions that may have caused or facilitated the invasion, thus providing training for the user regarding the consequences of the user's actions.

In the following detailed description, references are made to the accompanying drawings that form a part hereof, and that show by way of illustration specific embodiments or examples. In referring to the drawings, it is to be understood that like numerals represent like elements through the several figures, and that not all components described and illustrated with reference to the figures are required for all embodiments.

Referring now to FIG. 1, an illustrative operating environment 100 and several software components for providing a contextual, audible alert of an invasion of a computer system are shown, according to embodiments. The environment 100 includes a computer 102, which may be any type of computer device, including, but not limited to, a desktop computer, a laptop, a notebook, an ultra-mobile personal computer (PC), a pocket PC, a personal digital assistant, or a smartphone. A user 104 may interact with the computer 102 through a user-interface (UI) device, such as a computer terminal 106. It will be appreciated that any number of UI devices may be imagined, including, but not limited to, a mouse, a keyboard, a display, a trackball, a keypad, a stylus, or a touch-screen monitor.

The user 104 may use the computer 102 to execute application programs 108 that perform a number of functions, such as word processing, editing spreadsheets, reading email, and Web browsing. The application programs 108 may depend on system files 110, data files 112, and configuration settings 114 stored on the computer 102 in order to perform the desired functions. The system files 110 may consist of shared libraries, such as dynamic link library (DLL) files or component object model (COM) components, that provide UI, network, file access, and other services to the application programs 108. The data files 112 may include files that contain data specific to one of the application programs 108, such as a document file used by a word processing application program. In some cases, the data files 112 may contain executable modules as well, such as a spreadsheet file that contains macro code.

The configuration settings 114 provide the necessary information for the computer hardware, the operating system, and the application programs 108 on the computer 102 to operate, and may include user preference settings that control how these components behave. For example, the configuration settings 114 may include a list of software programs that are to be loaded when the computer 102 is started, the location and services provided by the various system files 110, and associations between types of the data files 112 and the corresponding application programs 108. The configuration settings 114 may be stored in a central location, such as the registry database in a computer, such as the computer 102, running the WINDOWS® operating system from MICROSOFT CORPORATION, in individual configuration files located throughout the computer 102, or some combination of the two.

According to embodiments, a malware program 116 may also execute on the computer 102. As described above, the malware program 116 is a program that invades or infects a computer, such as the computer 102, unexpectedly or without authorization from the user 104. The malware program 116 may be executing as the result of an action taken by the user 104 of the computer 102. For example, the user 104 may have opened an attachment to an e-mail received on the computer 102, may have opened a spreadsheet file containing a macro program, or may have clicked a link on a webpage being viewed in a Web browser application executing on the computer 102.

The intention of the malware program 116 may be to damage the computer 102 in some way, by erasing the data files 112 on the computer 102, for example; to collect private information from the computer, such as email addresses, bank account numbers, websites visited, etc.; or to cause the computer to serve as a platform for forwarding spam e-mail or launching denial-of-service attacks. Types of malware programs 116 include, but are not limited to, computer viruses, trojan horses, worms, rootkits, spyware, and adware.

The malware program 116 may invade and infect the computer 102 by making modifications to the system files 110, data files 112, or configuration settings 114, in order for the malware program to perform its intended function. For example, the malware program 116 may add itself to the list of programs to execute when the computer 102 is started in the configuration settings 114, replace an oft used DLL in the system files 110 with a copy containing the necessary instructions to load the malware program, or place a macro or other executable code in the data files 112 that causes the malware program to execute whenever one of the data files is loaded by the associated application program 108. It will be appreciated by one skilled in the art that many other forms of malware programs and invasions of a computer system may be imagined, and it is intended that all such forms be within the scope of the present invention.

In one embodiment, the computer 102 also includes an invasion detector program 118 responsible for detecting the invasion of the computer 102 by the malware program 116. The invasion detector program 118 may be loaded by the computer 102 upon startup and may run in the background and continuously monitor the system files 110, data files 112, configuration settings 114, and other components of the computer to detect changes that indicate an invasion of the computer 102 by a malware program, such as the malware program 116. As will be described below in more detail in regard to FIG. 2, when the invasion detector program 118 detects an invasion of the computer 102, the invasion detector program selects an appropriate alert tone from a set of alert tones 120 available on the computer 102 to play to the user 104, according to exemplary embodiments. The alert tone 120 is played through a speaker 122 connected to the computer 102. In addition, the invasion detector program 118 may log the details of the invasion to a diagnostic log file 124.

According to one embodiment, the alert tones 120 consist of a group of digital recordings or approximations of natural utterances that are contextually related to a particular type or severity of invasion of a computer. For example, one alert tone 120 may be a recording of a painful groan that would be played when an invasion of the computer 102 resulted in execution of a malware program, such as the malware program 116, which caused damage to the system files 110 or data files 112 on the computer. Playing the groan to the user 104 upon the invasion of the computer 102 clearly indicates to the user that the computer had been infected and that serious damage has resulted.

Another alert tone 120 may consist of a recording of a person saying "Oops!" This alert tone 120 may be played when an invasion of the computer 102 is detected that is not as severe, for example, upon the download of a tracking cookie by a Web browser application. By providing natural sounding alerts that are contextually related to the severity and type of invasion, the user 104 can be provided an immediate notification of the context of the invasion that has taken place, without having to have an understanding of computer terms or jargon in order to understand the complex messages displayed by traditional malware protection systems.

It will be appreciated that other types of sounds contextually related to the type and severity of an invasion may be played to the user 104, beyond the natural utterances described above. In a non-limiting example, an air-raid siren may be played to the user 104 upon detection of an invasion by a trojan horse program. It will further be appreciated that other forms of contextual alerts may be provided beyond the aural alert tones described herein. For example, upon invasion of the computer 102 by a malware program, such as the malware program 116, which destroys the system files 110 and data files 112, the computer may emit fake smoke or an odor approximating the smell of an electrical short, providing immediate feedback to the user 104 that the computer has been severely damaged.

In one embodiment, the alert tones 120 may be provided with the computer 102, such as when installed as part of the configuration by the computer manufacturer. This allows for support personnel to understand the meaning of each alert tone when diagnosing a computer problem. For instance, following the example provided above, if the user 104 contacts support personnel for the computer 102 and complains that "My computer says 'Oops' every time I visit this website," the support personnel will immediately know that the website is placing unauthorized cookies on the computer.

In another embodiment, the user 104 may provide the alert tones 120. The user provided alert tones 120 may be a set of digital recordings purchased and/or downloaded from the Internet, similar to ringtones for cell phone devices, or the alert tones may be recorded by the user 104 in his or her own voice, or the voices of family members or friends. For example, the user 104 may record a set of the alert tones 120 consisting of the user's spouse chastising the user by name at different levels of severity, to be matched contextually with various levels of severity of potential invasions of the computer 102.

Figure 2:
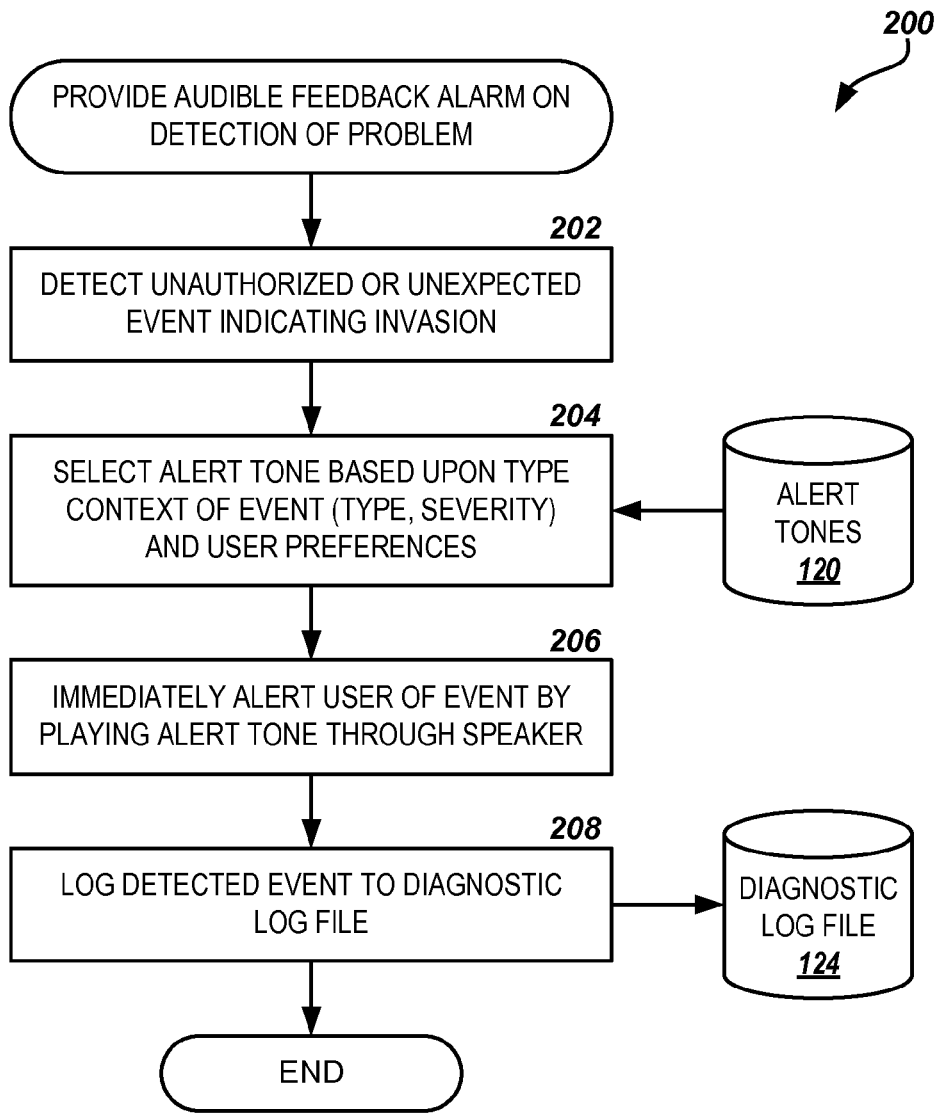
FIG. 2 is a flow diagram illustrating one method for providing contextual, audible feedback to the user upon detection of an invasion of the computer system, in accordance with exemplary embodiments.

Referring now to FIG. 2, additional aspects regarding the operation of the components and software modules described above in regard to FIG. 1 will be provided. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof.

It should also be appreciated that, while the operations are depicted in FIG. 2 as occurring in a sequence, various operations described herein may be performed by different components or modules at different times. In addition, more or fewer operations may be performed than shown, and the operations may be performed in a different order than illustrated in FIG. 2.

FIG. 2 illustrates an exemplary routine 200 for providing contextual, audible feedback to a user, such as the user 104, upon detection of an invasion of a computer system, such as the computer 102, in accordance with embodiments. The routine 200 begins at operation 202, where the invasion detector program 118 detects an unexpected and/or unauthorized event or events indicating an invasion of the computer 102 by a malware program, such as the malware program 116. As described above, the detected event may be a change in one or more of the system files 110, data files 112, configuration settings 114, or other components of the computer 102.

For example, the invasion detector program 118 may detect that the malware program 116 has added itself to the list of programs in the configuration settings 114 to execute when the computer 102 is started, or has replaced a system DLL in the system files 110 with a copy containing malicious code. It will be appreciated that many additional methods known in the art may be utilized by the invasion detector program 118 to detect an invasion of the computer, including, but not limited to, detection of a process running at an unexpected security level, detection of the loading of an un-signed executable or shared library file, or detection of a UI window being opened at coordinates outside of the visible area of the display.

Upon detection of the invasion of the computer 102, the routine 200 proceeds from operation 202 to operation 204, where the invasion detector program 118 selects the appropriate alert tone from the alert tones 120 to play to the user 104 in response to the invasion. As discussed above, the appropriate alert tone 120 is selected based upon the context of the invasion, according to embodiments. The context may include the type of the invasion as well as the severity of the consequences. The invasion detector program 118 may select a natural utterance that symbolizes pain, such as a groan, grunt, or "Ugh" as appropriate feedback for a type of invasion that causes damage to the computer 102. Similarly, the invasion detector program 118 may select a natural utterance that reflects concern, such as "Uh-oh" or "Look out!" for a type of invasion that collects private information.

In addition, the invasion detector program 118 may consider the severity of the invasion in selecting the appropriate alert tone 120. For an invasion that results in the collection of personal information to be sent to a remote computer over the Internet, the invasion detector program 118 may select an alert tone that relates to the severe privacy ramifications to the user 104, while an invasion that simply places a tracking cookie in a web browser program cache may result in more passive feedback, such as a sigh or "Oops!"

In a further embodiment, the invasion detector program 118 selects the appropriate alert tone 120 based upon user preferences on the computer 102 as well. Different user preference settings may be available for different users in the configuration settings 114 of the computer 102. A particular user 104 of the computer 102 may have downloaded or recorded a unique set of alert tones 120 from which the invasion detector program 118 is to select the appropriate alert tone. In addition, different sets of alert tones 120 may be provided with the computer 102 that are appropriate for different classes of users. For example, the invasion detector program 118 may select an alert tone of "Oh my!" in response to a particular type of invasion for an older generation user 104, but may select "Dude!" for the same type of invasion for a teenage user. It will be appreciated that the selection of the appropriate alert tone to utilize as feedback may also be based on other characteristics of users, including, but not limited to, level of knowledge, native language, age, or cultural experience.

From operation 204, the routine 200 proceeds to operation 206, where the invasion detector program 118 plays the selected alert tone 120 to the user 104 through the speaker 122 connected to the computer 102. According to one embodiment, the invasion detector program 118 plays the selected alert tone 120 immediately upon detection of the invasion so that the alert tone indicating the invasion is heard by the user 104 within close temporal proximity to the user's action that may have caused or facilitated the invasion. In this way, the contextual, audible feedback has a "training effect," in that the user 104 may learn the types of actions that may cause an invasion of the computer 102 as well as the potential consequences of similar such actions.

The routine 200 then proceeds from operation 206 to operation 208, where the invasion detector program 118 logs detailed information about the invasion to the diagnostic log file 124. This information may include the time and date that the invasion was detected, the event or events detected that indicated the invasion, and any other data that will aid support personnel in repairing the computer 102. From operation 208, the routine 200 ends.

Figure 3:
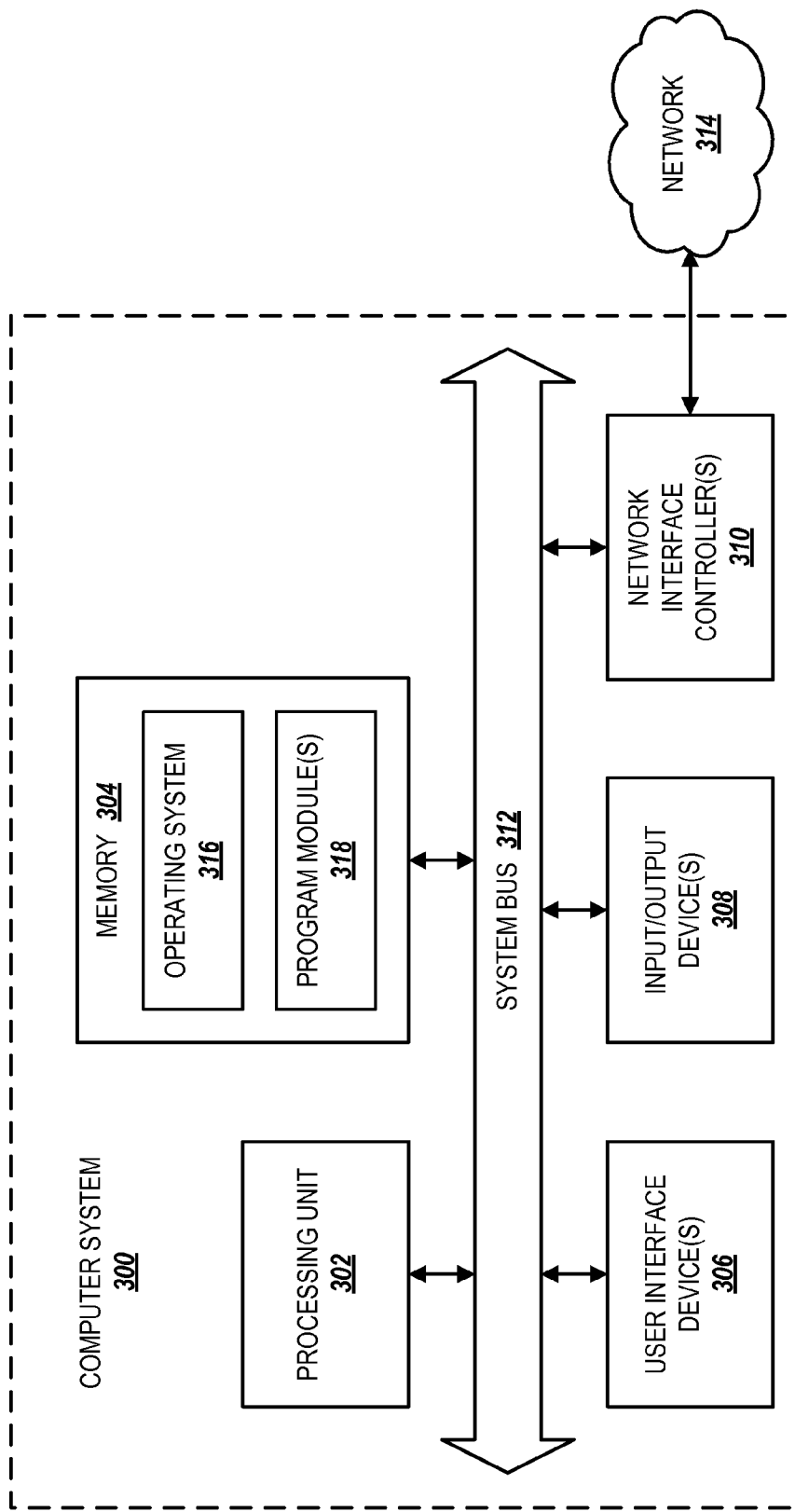
FIG. 3 is a block diagram showing an illustrative computer hardware and software architecture for a computing system capable of implementing aspects of the embodiments presented herein.

FIG. 3 is a block diagram illustrating a computer system 300 configured to provide contextual, audible feedback to a user upon detection of an invasion of the computer system, in accordance with exemplary embodiments. The computer system 300 may be utilized to implement the computer 102 described above in regard to FIG. 1. The computer system 300 includes a processing unit 302, a memory 304, one or more user interface devices 306, one or more input/output ("I/O") devices 308, and one or more network interface controllers 310, each of which is operatively connected to a system bus 312. The bus 312 enables bi-directional communication between the processing unit 302, the memory 304, the user interface devices 306, the I/O devices 308, and the network interface controllers 310.

The processing unit 302 may be a standard central processor that performs arithmetic and logical operations, a more specific purpose programmable logic controller ("PLC"), a programmable gate array, or other type of processor known to those skilled in the art and suitable for controlling the operation of the computer. Processing units are well-known in the art, and therefore not described in further detail herein.

The memory 304 communicates with the processing unit 302 via the system bus 312. In one embodiment, the memory 304 is operatively connected to a memory controller (not shown) that enables communication with the processing unit 302 via the system bus 312. The memory 304 includes an operating system 316 and one or more program modules 318, according to exemplary embodiments. Examples of operating systems, such as the operating system 316, include, but are not limited to, WINDOWS®, WINDOWS® CE, and WINDOWS MOBILE® from MICROSOFT CORPORATION, LINUX, SYMBIAN™ from SYMBIAN SOFTWARE LTD., BREW® from QUALCOMM INCORPORATED, MAC OS® from APPLE INC., and FREEBSD operating system. Examples of the program modules 318 include the application programs 108, the malware program 116, and the invasion detector program 118. In one embodiment, the program modules 318 are embodied in computer-readable media containing instructions that, when executed by the processing unit 302, perform the routine 200 providing contextual, audible feedback to a user upon detection of an invasion of the computer system, as described in greater detail above with respect to FIG. 2. According to further embodiments, the program modules 318 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 300.

The user interface devices 306 may include one or more devices with which a user accesses the computer system 300, such as the computer terminal 106. The user interface devices 306 may also include, but are not limited to, computers, servers, personal digital assistants, cellular phones, or any suitable computing devices. The I/O devices 308 enable a user to interface with the program modules 318. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, the speaker 122, a display screen or a printer.

The network interface controllers 310 enable the computer system 300 to communicate with other networks or remote systems via a network 314. Examples of the network interface controllers 310 may include, but are not limited to, a modem, a radio frequency ("RF") or infrared ("IR") transceiver, a telephonic interface, a bridge, a router, or a network card. The network 314 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 314 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for providing a contextual feedback of an invasion of a computer system, comprising:
   detecting, by an invasion detector program executing in the computer system, the invasion of the computer system;
   selecting, by the invasion detector program, a contextual alert from a plurality of contextual alerts stored on the computer system based on a context of the invasion;
   playing the contextual alert to a user of the computer system to alert of the invasion; and
   logging information regarding the context of the invasion to a log file.

2. The method of claim 1, wherein the contextual alert comprises a digital recording approximating a natural utterance related to the context of the invasion.

3. The method of claim 1, wherein the contextual alert comprises an emission of fake smoke from the computer.

4. The method of claim 1, wherein the contextual alert comprises an emission of an odor approximating a smell of an electrical short circuit.

5. The method of claim 1, wherein the context of the invasion comprises a type of the invasion and a severity of the invasion.

6. The method of claim 1, wherein the selection of the contextual alert is further based upon user preferences of the computer system.

7. The method of claim 1, wherein detecting the invasion of the computer system comprises detecting a change to one of a program file, a data file, or a configuration setting of the computer system.

8. A system for providing contextual feedback of an invasion of a computer system, comprising:
 a processing unit;
 a memory that stores an invasion detector program that, when executed by the processing unit, causes the processing unit to perform operations comprising
  detecting the invasion of the computer system,
  selecting a contextual alert from a plurality of contextual alerts stored on the computer system based on the context of the invasion, and
  playing the contextual alert to alert of the invasion,
 wherein each of the plurality of contextual alerts comprises a contextual response that inherently relates to a user a context of an invasion of the computer system.

9. The system of claim 8, wherein the contextual alert comprises a digital recording approximating a natural utterance related to the context of the invasion.

10. The system of claim 8, wherein the contextual alert comprises an emission of fake smoke from the computer.

11. The system of claim 8, wherein the contextual alert comprises an emission of an odor approximating a smell of an electrical short circuit.

12. The system of claim 8, wherein the context of the invasion comprises a type of the invasion and a severity of the invasion.

13. The system of claim 8, wherein the selection of the contextual alert is further based upon user preferences of the computer system.

14. The system of claim 8, wherein detecting the invasion of the computer system comprises detecting a change to one of a program file, a data file, or a configuration setting of the computer system.

15. The system of claim 8, wherein the invasion detector program is further operative to log information regarding the context of the invasion to a log file.

16. A computer readable storage device having computer executable instructions stored thereon that, when executed by a computer, cause the computer to perform operations comprising:
 detecting a change in a system configuration of the computer;
 selecting a contextual alert from a plurality of contextual alerts stored on the computer based on a type and a severity of the change in the system configuration, each of the plurality of contextual alerts representing a contextual response that inherently indicates to a user the type and the severity of changes in the system configuration;
 playing the contextual alert to alert of the change in the system configuration; and
 logging information regarding the change in the system configuration to a log file.

17. The computer readable storage device of claim 16, wherein the selection of the contextual alert is further based upon user preferences stored on the computer.

18. The computer readable storage device of claim 16, wherein one of the plurality of contextual alerts comprises a digital recording approximating a natural utterance contextually related to the type and the severity of the change in the system configuration of the computer.

19. The computer readable storage device of claim 16, wherein one of the plurality of contextual alerts comprises an emission of fake smoke from the computer.

20. The computer readable storage device of claim 16, wherein one of the plurality of contextual alerts comprises an emission of an odor approximating a smell of an electrical short circuit.

* * * * *